(12) United States Patent
Kavaklioglu et al.

(10) Patent No.: US 7,680,549 B2
(45) Date of Patent: Mar. 16, 2010

(54) DIAGNOSTICS IN INDUSTRIAL PROCESS CONTROL SYSTEM

(75) Inventors: Kadir Kavaklioglu, Eden Prairie, MN (US); David L. Wehrs, Eden Prairie, MN (US); Donald Robert Lattimer, Chaska, MN (US); Evren Eryurek, Melbourne, FL (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 307 days.

(21) Appl. No.: 11/397,319

(22) Filed: Apr. 4, 2006

(65) Prior Publication Data

US 2007/0010900 A1 Jan. 11, 2007

Related U.S. Application Data

(60) Provisional application No. 60/668,243, filed on Apr. 4, 2005.

(51) Int. Cl.
*G05B 11/01* (2006.01)

(52) U.S. Cl. .............................. 700/26; 700/21; 700/51; 700/55; 700/67; 702/183

(58) Field of Classification Search .................. 700/26, 700/31, 51, 108–110; 702/81, 84, 183
See application file for complete search history.

(56) References Cited

U.S. PATENT DOCUMENTS

| | | | |
|---|---|---|---|
| 5,665,899 A | 9/1997 | Willcox ...................... 73/1.63 |
| 5,746,511 A | 5/1998 | Eryurek et al. .................. 374/2 |
| 5,828,567 A | 10/1998 | Eryurek et al. ............... 364/184 |
| 5,956,663 A | 9/1999 | Eryurek ....................... 702/183 |
| 6,017,143 A | 1/2000 | Eryurek et al. ......... 364/148.06 |
| 6,047,220 A | 4/2000 | Eryurek ....................... 700/28 |
| 6,119,047 A | 9/2000 | Eryurek et al. ................. 700/28 |
| 6,356,191 B1 | 3/2002 | Kirkpatrick et al. ......... 340/501 |
| 6,370,448 B1 | 4/2002 | Eryurek ...................... 700/282 |
| 6,397,114 B1 | 5/2002 | Eryurek et al. ................. 700/51 |
| 6,434,504 B1 | 8/2002 | Eryurek et al. .............. 702/130 |
| 6,449,574 B1 | 9/2002 | Eryurek et al. ................. 702/99 |

(Continued)

FOREIGN PATENT DOCUMENTS

CN   1 514 928 A   7/2004

OTHER PUBLICATIONS

Office Action from European Patent Office for EP Serial No. 06749231.4-2206.

(Continued)

*Primary Examiner*—Albert DeCady
*Assistant Examiner*—Dave Robertson
(74) *Attorney, Agent, or Firm*—Westman, Champin & Kelly, P.A.

(57) ABSTRACT

A device for diagnosing operation of an industrial process control or monitoring system includes an input configured to receive an input related to a process signal. A first statistical parameter module provides a first statistical parameter output related to a statistical parameter of the process signal. A filter provides a filter output related to a filtered value of the process signal. A second statistical parameter module provides a second statistical parameter output related to a statistical parameter of the filter output. A diagnostic module diagnoses operation of the industrial process based upon the first and second statistical parameters.

32 Claims, 9 Drawing Sheets

U.S. PATENT DOCUMENTS

| | | | |
|---|---|---|---|
| 6,473,710 B1 | 10/2002 | Eryurek | 702/133 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,556,145 B1 | 4/2003 | Kirkpatrick et al. | 340/870.17 |
| 6,564,119 B1 * | 5/2003 | Vaculik et al. | 700/146 |
| 6,594,603 B1 | 7/2003 | Eryurek et al. | 702/104 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B2 | 9/2003 | Borgeson et al. | 702/183 |
| 6,654,697 B1 | 11/2003 | Eryurek et al. | 702/47 |
| 6,701,274 B1 | 3/2004 | Eryurek et al. | 702/140 |
| 6,735,484 B1 * | 5/2004 | Lenz | 700/51 |
| 6,745,107 B1 * | 6/2004 | Miller | 700/282 |
| 6,754,601 B1 | 6/2004 | Eryurek et al. | 702/104 |
| 6,772,036 B2 | 8/2004 | Eryurek et al. | 700/127 |
| 6,859,755 B2 | 2/2005 | Eryurek et al. | 702/183 |
| 6,865,509 B1 * | 3/2005 | Hsiung et al. | 702/182 |
| 6,889,166 B2 | 5/2005 | Zielinski et al. | 702/183 |
| 6,907,383 B2 | 6/2005 | Eryurek et al. | 702/183 |
| 6,970,003 B2 | 11/2005 | Rome et al. | 324/718 |
| 7,010,459 B2 | 3/2006 | Eryurek et al. | 702/182 |
| 7,018,800 B2 | 3/2006 | Huisenga et al. | 435/6 |
| 7,046,180 B2 | 5/2006 | Jongsma et al. | 341/141 |
| 7,085,610 B2 | 8/2006 | Eryurek et al. | 700/29 |
| 7,174,283 B2 * | 2/2007 | Berkooz et al. | 703/2 |
| 7,181,654 B2 * | 2/2007 | Ford et al. | 714/47 |
| 7,536,274 B2 * | 5/2009 | Heavner et al. | 702/183 |
| 2002/0029130 A1 | 3/2002 | Eryurek et al. | 702/183 |
| 2004/0061537 A1 * | 4/2004 | Flasza | 327/157 |

OTHER PUBLICATIONS

"Notification of Transmittal of the International Search Report and the Written Opinion" PCT/US2006/012472.

Office Action from Chinese Patent Office for Chinese Serial No. 200680011026.X, dated Nov. 28, 2008.

* cited by examiner

US 7,680,549 B2

DIAGNOSTICS IN INDUSTRIAL PROCESS CONTROL SYSTEM

The present application is based on and claims the benefit of U.S. provisional patent application Ser. No. 60/668,243, filed Apr. 4, 2005, the content of which is hereby incorporated by reference in its entirety.

BACKGROUND OF THE INVENTION

The present invention relates to industrial process control and monitoring systems. More specifically, the present invention relates to diagnostic and such systems.

Process control loops are used in industry to control operation of a process, such as an oil refinery. A transmitter is typically part of the loop and is located in the field to measure and transmit a process variable such as pressure, flow or temperature, for example, to control room equipment. A controller such as a valve controller is also part of the process control loop and controls position of a valve based upon a control signal received over the control loop or generated internally. Other controllers control electric motors or solenoids for example. The control room equipment is also part of the process control loop such that an operator or computer in the control room is capable of monitoring the process based upon process variables received from transmitters in the field and responsively controlling the process by sending control signals to the appropriate control devices. Another process device which may be part of a control loop is a portable communicator which is capable of monitoring and transmitting process signals on the process control loop. Typically, these are used to configure devices which form the loop.

There is an ongoing desire to perform diagnostics on such industrial control and monitoring systems. Preferably, such diagnostics identify the possibility that a component will fail prior to its ultimate failure such that preventive maintenance can be performed.

SUMMARY

A device for diagnosing operation of an industrial process control or monitoring system includes an input configured to receive an input related to a process signal. A first statistical parameter module configured provides a first statistical parameter output related to a statistical parameter of the process signal. A filter provides a filter output related to a filtered value of the process signal. A second statistical parameter module provides a second statistical parameter output related to a statistical parameter of the filter output. A diagnostic module diagnoses operation of the industrial process based upon the first and second statistical parameters. An example of a specific filter implementation based upon a difference filter is also provided.

DETAILED DESCRIPTION

As discussed in the Background section, there is an ongoing need to perform diagnostics in industrial control and monitoring systems. Some pioneering work in this area is described U.S. Pat. Nos. 6,449,574; 6,772,036; 6,047,220; 5,746,511; 5,828,567; 5,665,899; 6,017,143; 6,119,047; 5,956,663; 6,370,448; 6,519,546; 6,594,603; 6,556,145; 6,356,191; 6,601,005; 6,397,114; 6,505,517; 6,701,274; 6,754,601; 6,434,504; 6,654,697; 6,539,267; 6,532,392; 6,611,775; 6,615,149; 6,907,383; 6,629,059; 6,859,755; and 6,889,166 which are incorporated herein by reference in their entirety.

The present invention includes the recognition that certain diagnostic applications require signal filtering in order to provide improved diagnostics. A modular filtering architecture is provided along with filter algorithms.

Figure 1:
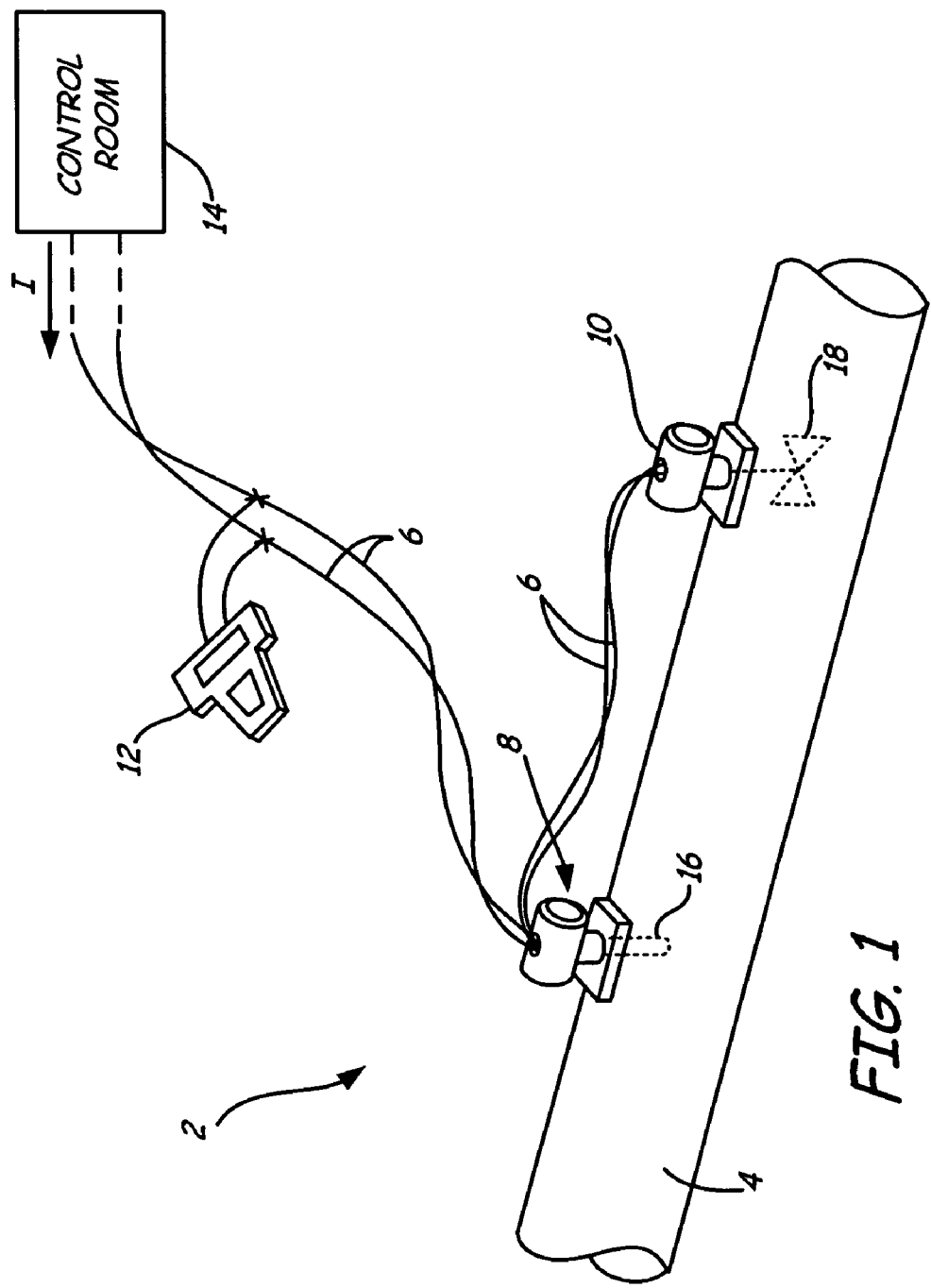
FIG. 1 is a diagram of an industrial process control or monitoring system for use with the present invention.

FIG. 1 is a diagram showing an example of a process control system 2 which includes process piping 4 which carries a process fluid and two wire process control loop 6 carrying loop current I. A transmitter 8, controller 10, which couples to a final control element in the loop such as an actuator, valve, a pump, motor or solenoid, communicator 12, and control room 14 are all part of process control loop 6. It is understood that loop 6 is shown in one configuration and any appropriate process control loop may be used such as a 4-20 mA loop, 2, 3 or 4 wire loop, multi-drop loop and a loop operating in accordance with the HART®, Foundation Fieldbus™ or other digital or analog communication protocol including wireless techniques. In operation, transmitter 8 senses a process variable such as flow using sensor 16 and transmits the sensed process variable over loop 6. The process variable may be received by controller/valve actuator 10, communicator 12 and/or control room equipment 14. Controller 10 is shown coupled to valve 18 and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another configuration, controller 10 internally generates the control signal based-upon process signals received over loop 6. Communicator 12 may be the portable communicator shown in FIG. 1 or may be a permanently mounted process unit which monitors the process and performs computations. Process devices include, for example, transmitter 8 (such as a 3051S transmitter available from Rosemount Inc.), controller 10, communicator 12 and control room 14 shown in FIG. 1. Another type of process device is a PC, programmable logic unit (PLC) or other computer coupled to the loop using appropriate I/O circuitry to allow monitoring, managing, and/or transmitting on the loop.

In one aspect, the present invention provides a group of techniques for processing field data through various statistical and digital signal processing algorithms and providing the processed data for use in subsequent diagnostic operations. For example, the processed data can be used for diagnostics to provide alarms and warnings to field devices and host systems. The techniques can be used with any type of process control loop. It is not limited to the loops described herein such as those operations in accordance with HART®, Foundation Fieldbus™, Profibus, or other protocols.

Performing statistical and digital signal processing within a field device provides the capability to operate on the raw data measurement before any measurements and control related modifications are made to the sensor data. Therefore, the signatures computed within the device are better indicators of the conditions off the system such as the mechanical equipment in the process in which the device is installed. Typically, the communications systems used in industrial process control or monitoring systems do not operate at sufficient speed to provide raw data on a plant-wide basis. In other words, typically all of the raw data collected in a process control or monitoring system cannot be transmitted to other field devices or to a control room due to bandwidth limitations of the communication protocols. Further, even if such transmission is possible, loading the network (process control loop) with excessive raw data transfers can adversely affect the other tasks which rely on the network for measurement and control.

Figure 2:
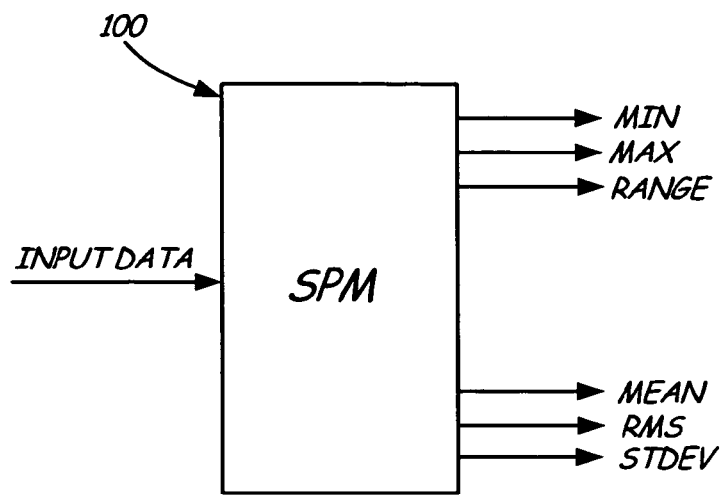
FIG. 2 is a simplified diagram of a statistical parameter module.

The present invention utilizes a basic statistical processing building block 100 which is illustrated in FIG. 2. FIG. 2 is a block diagram showing the statistical parameter module 100 which can provide any number of statistical functions. In the embodiment of FIG. 2, the statistical parameter module 100 receives an input data stream which can comprise, for example, the digitized data from a process variable sensor. The statistical parameter module 100 provides one or more statistical parameters of the input data. For example, the statistical parameter module 100 can provide minimum or maximum values, a range, a mean of the data, RMS (root mean squared) value of the data and/or a standard deviation of the data. As used herein, "statistical parameter" includes any statistical parameter of the data including minimum, maximum, range, mean, RMS, standard deviation, $Q_{25}$, $Q_{50}$, $Q_{75}$, and others.

Figure 3:
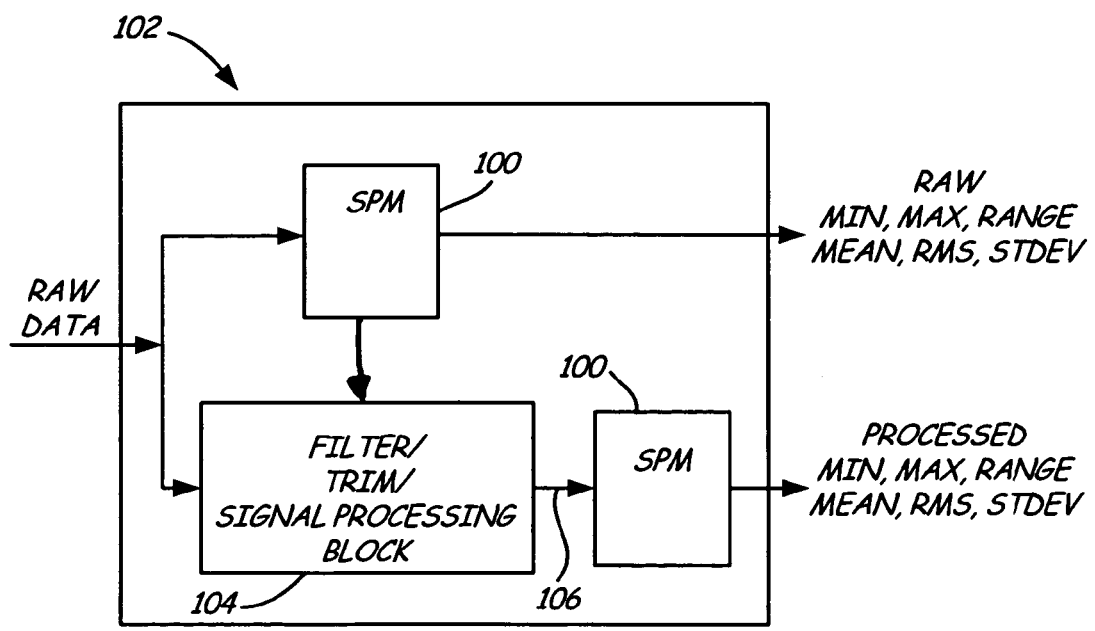
FIG. 3 is a simplified diagram of a module including two statistical parameter modules and a filter.

FIG. 3 is a block diagram showing an enhanced statistical parameter module 102 which includes statistical parameter module 100 illustrated in FIG. 2. Module 102 receives raw data and provides at least two data paths therethrough. One data path provides the raw data directly to a statistical parameter module 100 which provides an output related to a statistical parameter of the raw data. A second data path provides the raw data to a preprocessing block 104. Preprocessing block 104 can apply a filter or trimming process to the raw data stream. The preprocessed data 106 is provided to a second statistical parameter module 100 which provides an output related to a statistical parameter of the preprocessed raw data. The preprocessing can be performed as desired. One example of a preprocess includes the trimming of the raw data which can be used to eliminate spikes, outliers in the data or other bad data points so they do not skew the statistical parameter determined by the statistical parameter module 100. The trimming can be in accordance with any appropriate technique including techniques which are based upon sorting and removal of certain data points such as data points falling outside of upper and lower percentages of the data, as well as using thresholds based upon standard deviation, a weighted moving average, etc. The trimmed data may be removed from the data sequence. In another example, the trimmed data can be replaced using interpolation techniques.

Figure 4:
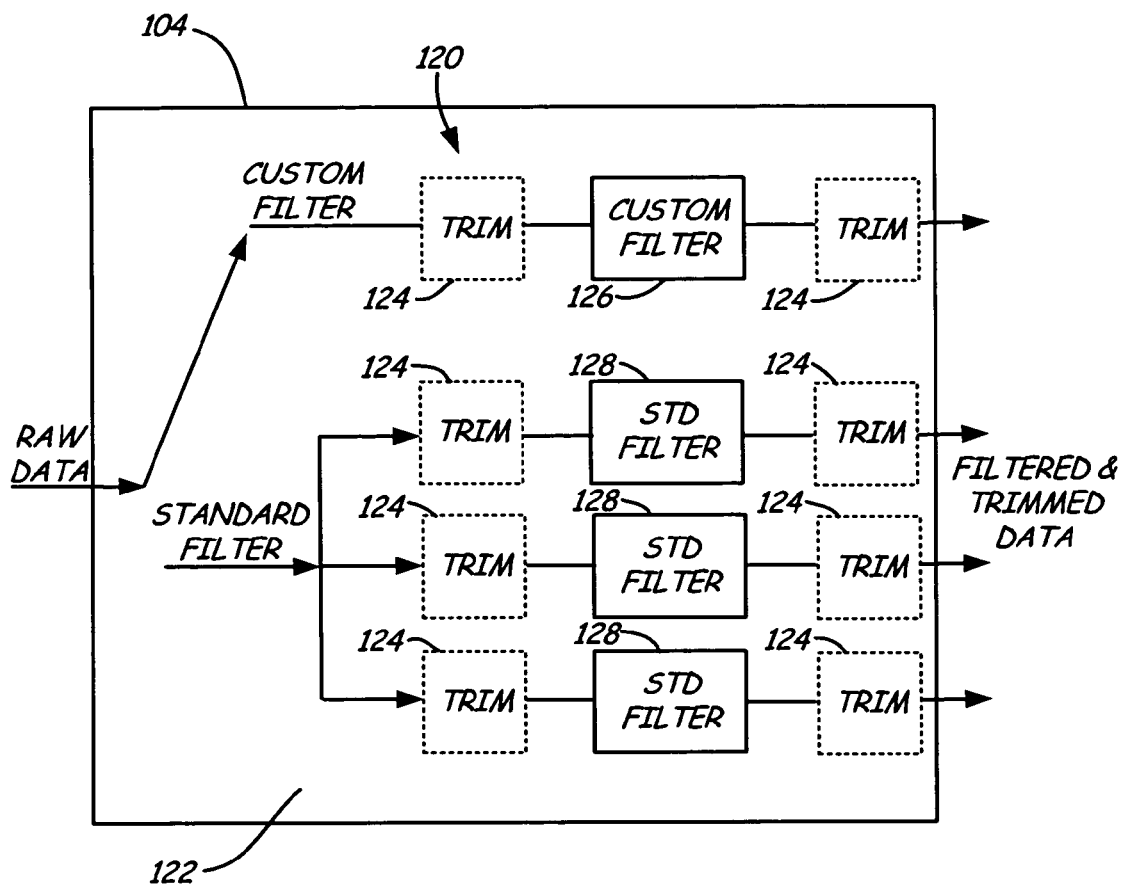
FIG. 4 is a block diagram showing the filter of FIG. 3.
Figure 5:
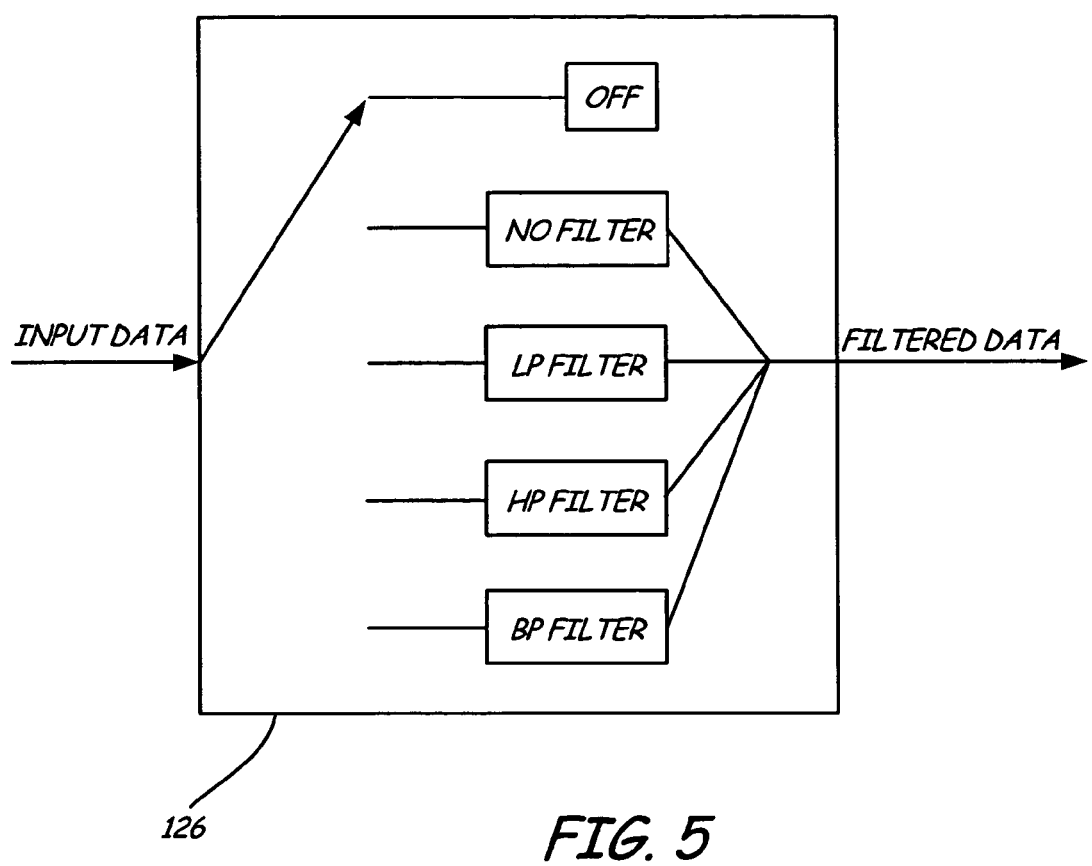
FIG. 5 is a block diagram showing the filter of FIG. 4.

FIG. 4 is a block diagram of the filter and trim signal preprocessing block 104. Block 104 provides a highly configurable filter in which the raw data input can be provided to a customized filter 120 or through a standard filter 122. Customized filter includes optional prefilter blocks 124 and/or post filter trimming blocks 124 to trim the data stream as discussed above, along with a customized filter 126 selected as desired. Standard filter 122 also includes optional pre and post trimming block 124 along with a standardized filter block 126. Standard 126 can include a number of different selectable standardized filters which can be selected as desired. In the example of FIG. 5, the standardized filter 126 includes four filters (no filter, low pass filter, high pass filter, and band pass filter) which can be selected as desired along with an off position.

In the above discussion, the filters and trimming functions can be implemented in digital circuitry, for example in a digital signal processor or a microprocessor. Using the configuration set forth in FIG. 3, a highly configurable diagnostic system can be implemented. In one embodiment, a statistical parameter of the raw data stream is compared to a statistical parameter of the preprocessed data stream. If the comparison falls outside of an acceptable range, a diagnostic output condition can be provided which indicates a diagnostic condition of the process control system.

Figure 6:
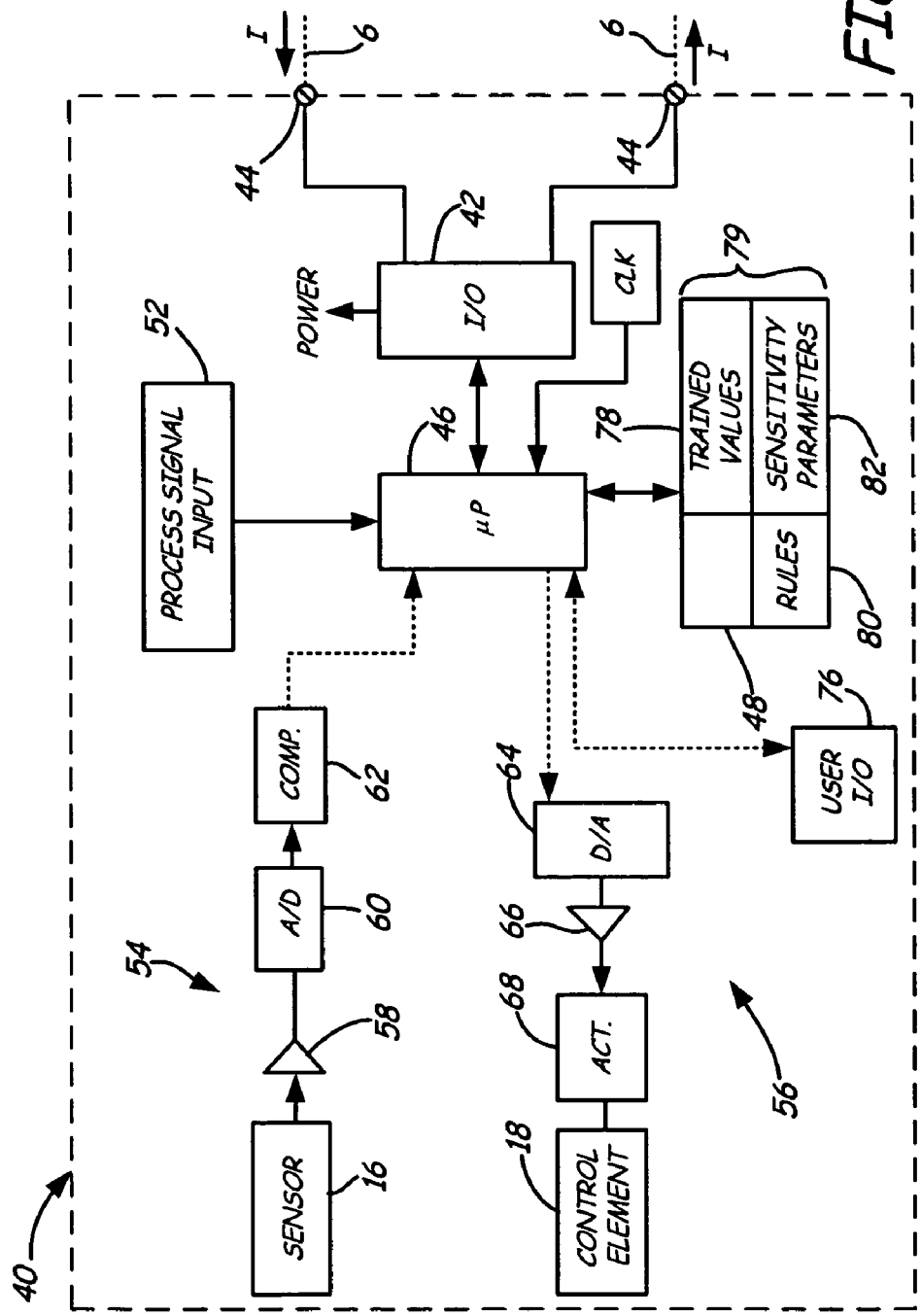
FIG. 6 is a block diagram showing a process device of FIG. 1 in more detail.

Any of the process devices 8, 10, 12 or 14 shown in FIG. 1 may include diagnostic circuitry in accordance with the present invention. FIG. 6 is a block diagram of a process device 40 forming part of loop 6. Device 40 is shown generically and may comprise any process device such as transmitter 8, controller 10, communicator 12 or control room equipment 14. Control room equipment 14 may comprise, for example, a DCS system implemented with a PLC and controller 10 may also comprise a "smart" motor and pump. Process device 40 includes I/O circuitry 42 coupled to loop 6 at terminals 44. I/O circuitry has preselected input and output impedance known in the art to facilitate appropriate communication from and to device 40. Device 40 includes microprocessor 46, coupled to I/O circuitry 42, memory 48 coupled to microprocessor 46 and clock 50 coupled to microprocessor 46. Microprocessor 46 receives a process signal input 52. Block input is intended to signify input of any process signal, and as explained above, the process signal input may be a process variable, or a control signal and may be received from loop 6 using I/O circuitry 42 or may be generated internally within field device 40. Field device 40 is shown with a sensor input channel 54 and a control channel 56. Typically, a transmitter (such as transmitter 8) will exclusively include sensor input channel 54 while a controller such as controller 10 will exclusively include a control channel 56. Other devices on loop 6 such as communicator 12 and control room equipment 14 may not include channels 54 and 56. It is understood that device 40 may contain a plurality of channels to monitor a plurality of process variables and/or control a plurality of control elements as appropriate.

Sensor input channel 54 includes sensor 16, sensing a process variable and providing a sensor output to amplifier 58 which has an output which is digitized by analog to digital converter 60. Channel 54 is typically used in transmitters such as transmitter 8. Compensation circuitry 62 compensates the digitized signal and provides a digitized process variable signal to microprocessor 46. In one embodiment, channel 54 comprises a diagnostic channel which receives a diagnostic signal.

When process device 40 operates as a controller such as controller 8, device 40 includes control channel 56 having control element 18 such as a valve, for example. Control element 18 is coupled to microprocessor 46 through digital to analog converter 64, amplifier 66 and actuator 68. Digital to analog converter 64 digitizes a command output from microprocessor 46 which is amplified by amplifier 66. Actuator 68 controls the control element 18 based upon the output from amplifier 66. In one embodiment, actuator 68 is coupled directly to loop 6 and controls a source of pressurized gas (not shown) to position control element 18 in response to the current I flowing through loop 6. In one embodiment, controller 10 includes control channel 56 to control a control element and also includes sensor input channel 54 which provides a diagnostic signal such as valve stem position, force, torque, actuator pressure, pressure of a source of pressurized air, etc.

In one embodiment, I/O circuitry 42 provides a power output used to completely power other circuitry in process device 40 using power received from loop 6. Typically, field devices such as transmitter 8, or controller 10 are powered off the loop 6 while communicator 12 or control room 14 has a separate power source. As described above, process signal input 52 provides a process signal to microprocessor 46. The process signal may be a process variable from sensor 16, the control output provided to control element 18, a diagnostic signal sensed by sensor 16, or a control signal, process variable or diagnostic signal received over loop 6, or a process signal received or generated by some other means such as another I/O channel.

A user I/O circuit 76 is also connected to microprocessor 46 and provides communication between device 40 and a user. Typically, user I/O circuit 76 includes a display and audio for output and a keypad for input. Typically, communicator 12 and control room 14 includes I/O circuit 76 which allows a user to monitor and input process signals such as process variables, control signals (setpoints, calibration values, alarms, alarm conditions, etc.). A user may also use circuit 76 in communicator 12 or control room 14 to send and receive such process signals to transmitter 8 and controller 10 over loop 6. Further, such circuitry could be directly implemented in transmitter 8, controller 10 or any other process device 40.

Figure 7:
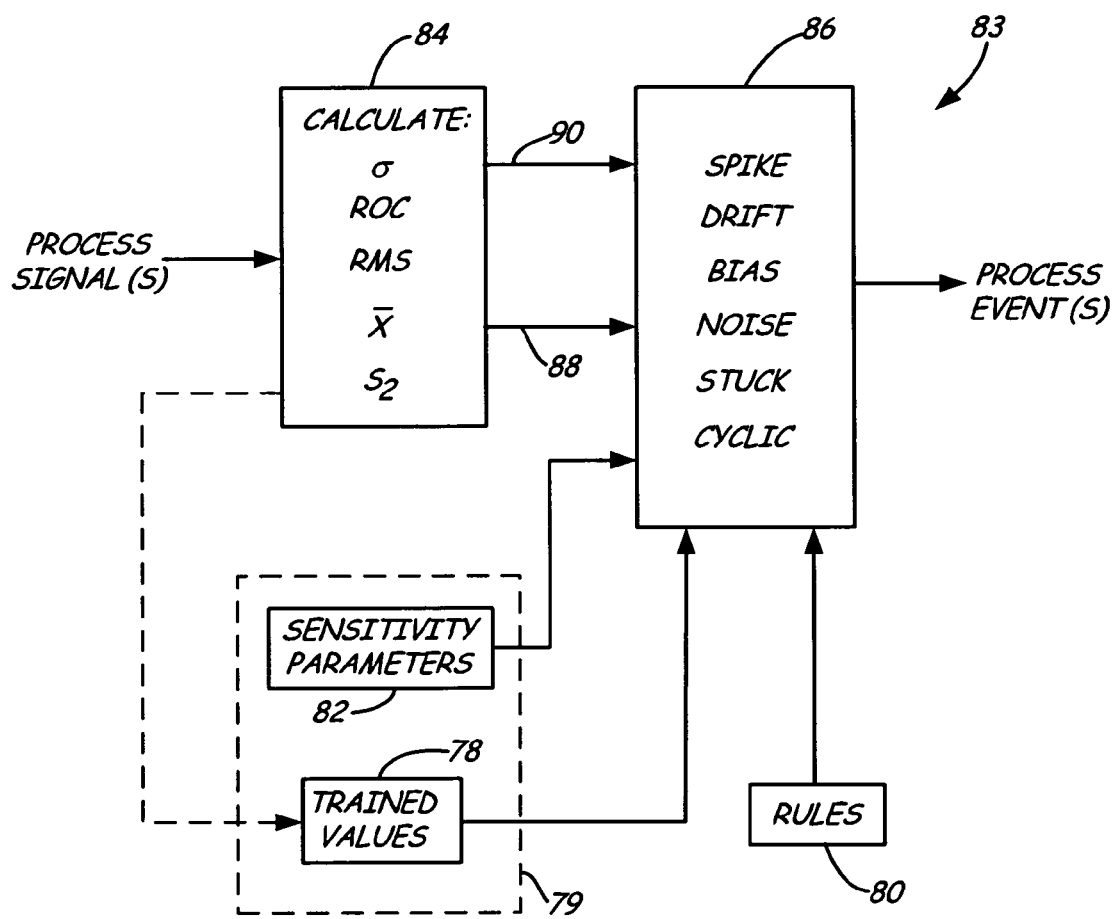
FIG. 7 is a logical block diagram showing operation of a device for diagnosing operation of the process control or monitoring system of FIG. 1.

Microprocessor 46 acts in accordance with instructions stored in memory 48. Memory 48 also contains optional trained values 78, rules 80 and sensitivity parameters 82. The combination of the sensitivity parameters 82 and the trained values 78 provide a nominal value 79. FIG. 7 is a block diagram 83 showing a logical implementation of device 40. Logical block 84 receives process signals and calculates statistical parameters for the process signals. Block 84 provides a statistical parameter output 88 of the raw process signal and a statistical parameter output 90 of the preprocessed process signal as discussed above. These statistical parameters include, for example, standard deviation, mean, sample variance, root-mean-square (RMS), range ($\Delta R$), rate of change (ROC) and skewness of the process signal. These can be determined using the following equations:

$$\text{mean} = \bar{x} = \frac{1}{N}\sum_{i=1}^{N} X_i \qquad \text{Eq. 1}$$

$$\text{RMS} = \sqrt{\frac{1}{N}\sum_{i=1}^{N} X_i^2} \qquad \text{Eq. 2}$$

$$\text{varience} = S^2 = \frac{1}{n-1}\sum_{i=1}^{n}(x_i - \bar{x})^2 \qquad \text{Eq. 3}$$

-continued $$\text{standard deviation} = S = \sqrt{\frac{1}{n-1}\sum_{i=1}^{n}(x_i - \bar{x})^2} \qquad \text{Eq. 4}$$

$$ROC = r_i = \frac{x_i - x_{i-1}}{T} \qquad \text{Eq. 5}$$

$$\Delta R = x_{MAX} - x_{MIN} \qquad \text{Eq. 6}$$

$$\text{skewness} = \frac{1}{(n-1)S^3}\sum_{i=1}^{n}(x_i - \bar{x})^3 \qquad \text{Eq. 7}$$

Where N is the total number of data points in the sample period, $x_i$ and $x_{i-1}$ are two consecutive values of the process signal and T is the time interval between the two values. Further, $X_{MAX}$ and $X_{MIN}$ are the respective maximum and minimum of the process signal over a sampling or training time period. These statistical parameters are calculated alone or in any combination. It will be understood that the invention includes any statistical parameter including those which are explicitly set forth herein. The calculated statistical parameters are received by rule calculation logic block 86 which operates in accordance with rules 80 stored in memory 48. Block 86 provides a diagnostic module. Block 86 compares parameters 88 and 90 in accordance with rules 80 and sensitivity parameters 82. Rules block 86 may also receive optional trained values 78 from memory 48. If implemented, trained values are the nominal or (i.e., typical) statistical parameter value for the raw and/or preprocessed process signal and comprise the same statistical parameters (standard deviation, mean, sample variance, root-mean-square (RMS), range and rate of change, etc.) used in logical block 84. The trained values can be provided by the manufacturer, periodically updated by addressing device 40 over loop 6 or can be learned during normal operation of the process.

Rule calculation block 86 receives sensitivity parameters 82 from memory 48 along with statistical parameters 88 and 90. Block 86 provides examples of a number of different rules. Each sensitivity parameter 82 provides an acceptable range or relationship as determined by the appropriate rule 80 between the statistical parameter of the raw data 88 and the statistical parameter of the preprocessed data 90. Since the sensitivity parameter 82 may be set by the manufacturer, received over loop 6 or input using input circuitry 76, the sensitivity parameters can be adjusted for a specific application. For example, in process control applications where high accuracy is required, the sensitivity parameters are set so as to allow only small variations of the process signals relative to the statistical parameters of the preprocessed process signals. The use of sensitivity parameters allows the diagnostic and event detection decision making performed by diagnostic circuitry 86 to be controlled based upon the particular process and the requirements of the user. The particular diagnostic output is determined based upon the application, data and rules. Examples include identification of a spike, drift, bias, noise, stuck or cyclic condition in the process. It is appreciated that the diagnostic output may be related to the industrial process itself or to the field devices such as transmitters and controllers that are used to monitor and/or control the industrial process.

Although the various functions set forth herein can be implemented using any appropriate filter, in one configuration, a specific filter is provided as discussed below. This specific filter is applicable to any configuration and is not limited to the particular architectures set forth herein. In one configuration, a filter is provided to improve intermediate and long term variation in a given signal and further to isolate short term variation. The short term variation in the signal is sometimes referred to as the "process noise." One standard technique of isolating the process noise of a signal is to implement a digital high pass filter in software. The filter can comprise a type of IIR or a type of FIR. A typical FIR filter of order n can be implemented as follows:

$$y_i = \sum_{i=0}^{n} a_i x_{t-i} \qquad \text{Eq. 8}$$

where y is the filtered value, x are the current and previous measurements and $x_{t-i}$ are the current/previous measurements and $a_i$ are the filter coefficients. Such filters can be designed to match a certain frequency response criteria to a desired filter transfer function.

Figure 8:
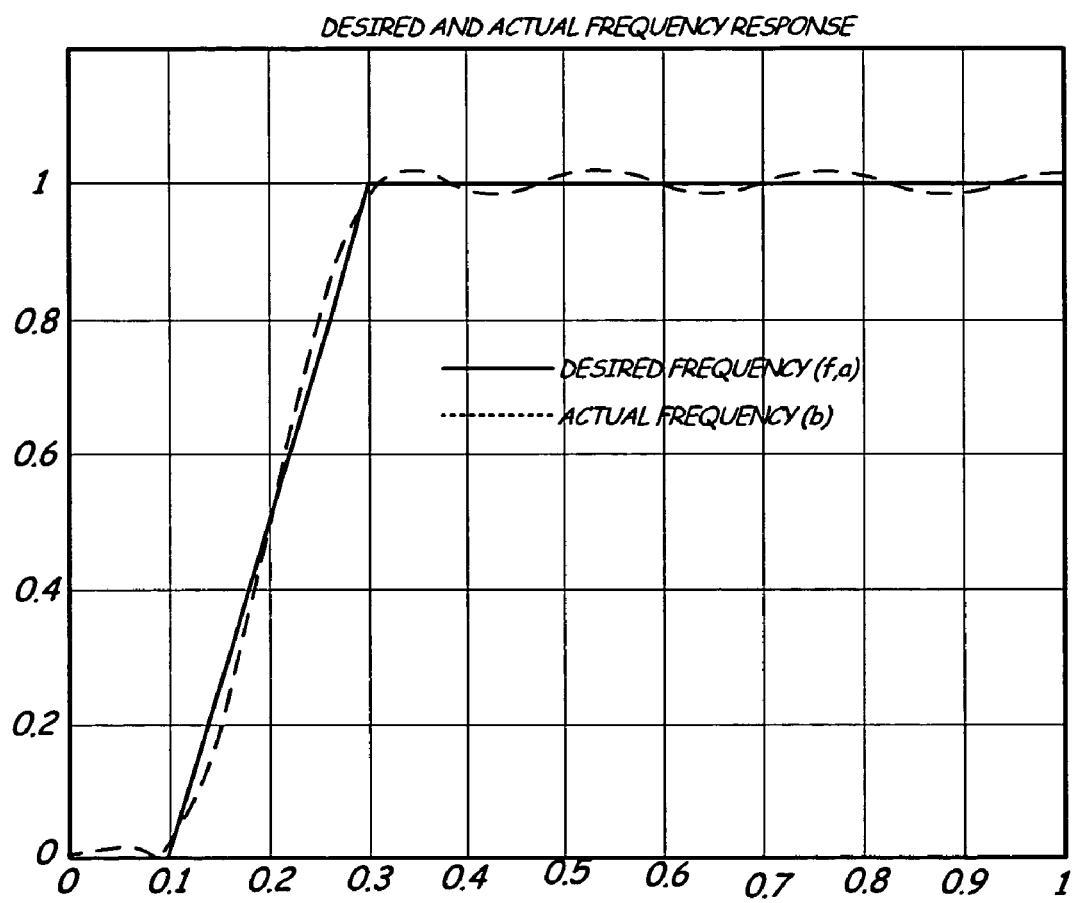
FIG. 8 is a graph of the frequency response which illustrates normalized magnitude versus frequency for an FIR filter.

For example, one type of existing filter is used to identify a plugged line condition and uses a $16^{th}$ order FIR filter using the transfer function set forth in Equation 8. In such a filter configuration is illustrated in FIG. 8. In FIG. 8, frequency is normalized so that one is equal to one half of the sampling rate which is 11 Hz. Therefore, the filter illustrated in FIG. 8 will stop all parts of the signal from DC to about 1.1 Hz, and pass the parts from 3.3 Hz to 11 Hz. The transition band is from 1.1 Hz to 3.3 Hz. The primary purpose of such a filter is to remove transients from the signal so that other statistical parameters, such as standard deviation of flow noise, can be calculated. However, such a filter cannot guarantee that all transients will be removed since some transients will have components which are higher frequencies. Further, the transition band cannot be moved much higher because this could filter some process noise along with the transients. In other words, the filter will either pass some transients or filter out some flow noise. In addition, since the DC gain will not be zero, the mean of the filtered signal will not reach zero and will carry and offset value. This also is not desirable.

Figure 9:
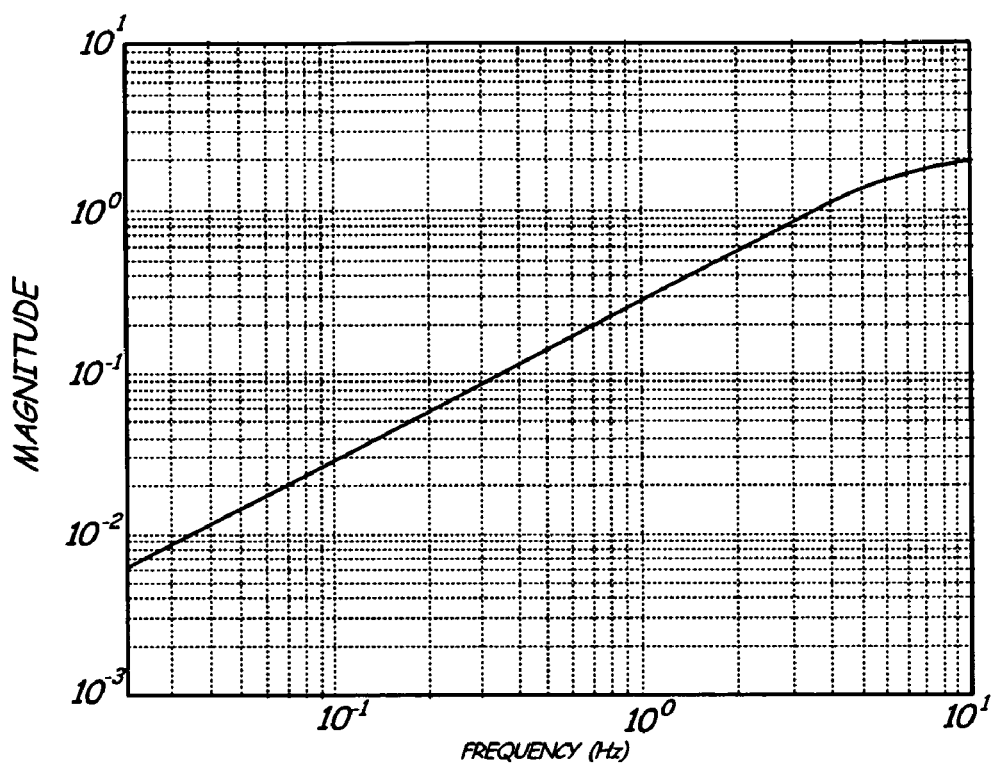
FIG. 9 is a graph of magnitude versus frequency for a difference filter.
Figure 10:
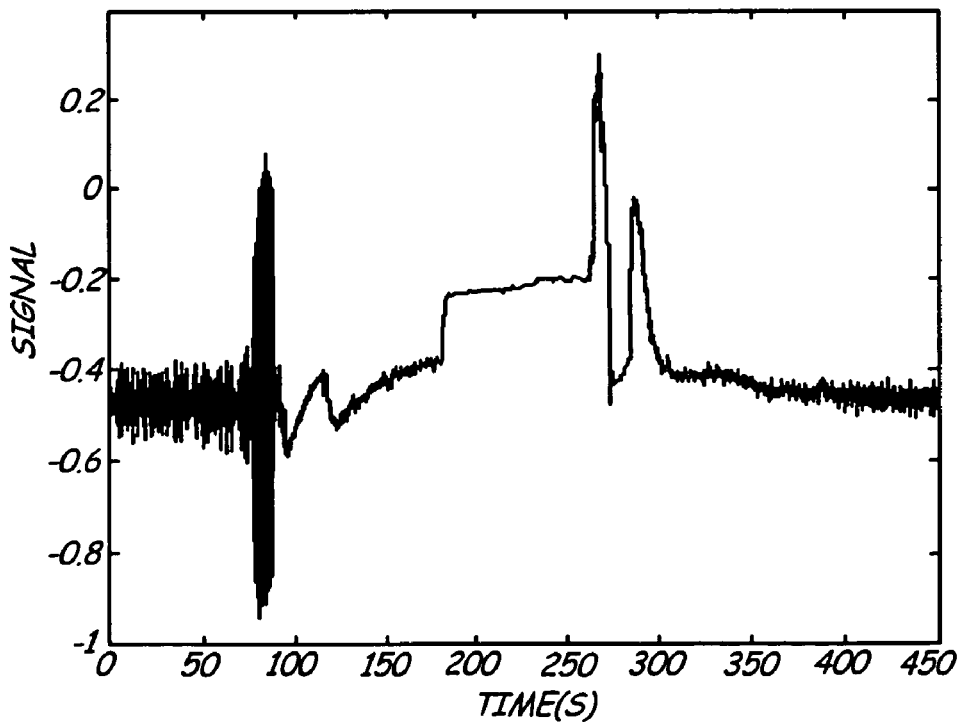
FIG. 10 is a graph of a process pressure signal including a trend along with process noise.
Figure 11:
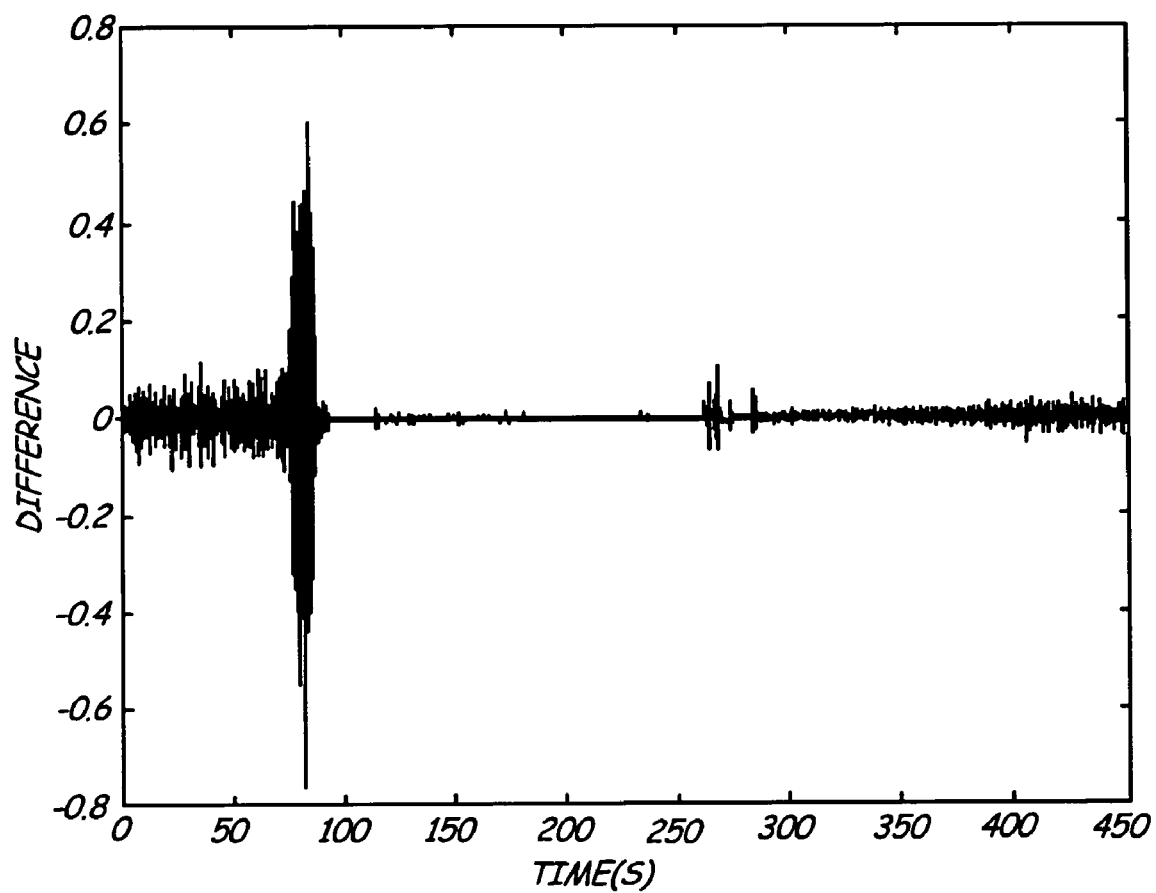
FIG. 11 is a graph of a difference versus time showing the filtered output based upon the input signal illustrated in FIG. 10.

The filter of the present invention can be preapplied to the measurement sequence to evaluate the short term variation in the signal. The filter can be implemented as a first order filter and require only one subtraction per measurement point, compared to 17 multiplications and 16 additions for the $16^{th}$ order FIR filter discussed above. The filter of the present invention can remove trends and transients and isolate process noise. The filter is implemented as a difference filter. A first order difference filter is defined as $$y_t = x_t - x_{t-1} \qquad \text{Eq. 9}$$

where y is the output signal and $x_t$ is the current value of the input signal and $x_{t-1}$ is the previous value of the input signal. FIG. 9 is a graph of magnitude versus frequency for such a filter. The filter continuously promotes higher frequency values and similarly continuously demotes lower frequency values. As the frequency content of the trends and transients in a typical process signal is not known, the filter of Equation 9 provides desirable response for all trends in the signal. FIG. 10 is a graph of a pressure signal which includes a signal trend along with some pressure noise. When the filter of Equation 9 is applied to the signal of FIG. 10, the resultant signal is illustrated in FIG. 11 which is a graph of difference versus time. As illustrated in FIG. 11, the difference filter is well suited for providing the process noise signal for use in subsequent diagnostics. The pass band gain of the filter can be scaled to match engineering units or other criteria as desired.

As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

Although the present invention has been described with reference to preferred embodiments, workers skilled in the art will recognize that changes may be made in form and detail without departing from the spirit and scope of the invention. The various functional blocks and circuitry described herein can be implemented in digital or analog circuitry. Various functional blocks and circuitry may share components and may be partially or wholly implemented in the same circuit. For example, digital processing circuitry can be employed to implement numerous functions based upon programming instructions stored in memory. The rules block 86 provides one example diagnostic module configured to diagnose operation of the industrial process based upon first and second statistical parameters, however, the present invention may be used with other diagnostic modules and is not limited the diagnostic module discussed herein. As used herein, diagnosing operation of an industrial process controller monitoring system includes diagnosing operation of the industrial process external to a field device as well as internal to the field device. For example, the diagnosing can include identifying the occurrence of a degrading element or a plugged line within a process device, or used to couple a process device to the industrial process. Custom filters can be updated in the field using parameters received over any appropriate technique. The present invention is applicable to other configurations including multivariable applications. For example, a field device can include multiple sensors in which all of the data processing discussed above are performed on the multiple measurement data streams. In another example configuration, a field device that includes a single sensor also receives process data from other field devices for use in making and performing diagnostics on multiple measurements.

What is claimed is:

1. A field device for diagnosing operation of an industrial process control or monitoring system, comprising:
    an input coupled to the industrial process configured to receive a process signal;
    a microprocessor configured to implement:
        an enhanced statistical parameter module comprising:
            a first statistical parameter module having a first statistical parameter output related to a statistical parameter of the received process signal, wherein the statistical parameter is selected from the group of statistical parameters comprising minimum, maximum, range, mean, root mean squared, standard deviation, $Q_{25}$, $Q_{50}$ and $Q_{75}$;
            a filter implementing a plurality of filter algorithms having a filter output related to a filtered value of the received process signal based upon at least one of the filter algorithms;
            a second statistical parameter module having a second statistical parameter output related to a statistical parameter of the filter output, the second statistical parameter selected from the group of statistical parameters consisting of minimum, maximum, range, mean, root mean squared, standard deviation, $Q_{25}$, $Q_{50}$ and $Q_{75}$; and
        a diagnostic module configured to diagnose operation of the industrial process based upon the first and the second statistical parameters;
    an output configured to provide a diagnostic output from diagnostic module.

2. The device of claim 1 wherein the filter output further comprises trimmed data from the input data.

3. The device of claim 2 wherein the filter is configured to remove outliers in the input data.

4. The device of claim 2 wherein the filter is configured to remove data from the input data based upon a comparison of the input data with a moving average.

5. The device of claim 2 wherein the filter is configured to remove data spikes in the input data.

6. The device of claim 1 wherein the filter comprises a low pass filter.

7. The device of claim 1 wherein the filter comprises a band pass filter.

8. The device of claim 1 wherein the filter comprises a high pass filter.

9. The device of claim 1 wherein the filter comprises a custom filter.

10. The device of claim 9 wherein the custom filter is based upon a received parameter.

11. The device of claim 1 including a second input configured to receive a second input related to a second process signal and wherein the diagnostic module diagnoses operation of the industrial process further based upon the second process signal.

12. The device of claim 1 wherein the diagnostic module is configured to diagnose operation of the industrial process further based upon a rule.

13. The device of claim 1 wherein the diagnostic module is configured to diagnose operation of the industrial process further based upon a sensitivity parameter.

14. The device of claim 1 including an input/output connection coupled to a process control loop.

15. The device of claim 14 wherein power for the device is received from a process control loop.

16. The device of claim 1 including a sensor configured to provide an output related to a sensed process variable on a two-wire process control loop.

17. The device of claim 1 including a control element configured to control a process variable and input configured to receive a control signal from a two-wire process control loop.

18. The device of claim 1 wherein the filter includes a plurality of selectable filter functions.

19. The device of claim 1 wherein the filter comprises a difference filter.

20. The device of claim 19 wherein the difference filter is configured to provide a difference in the process variable signal between at least two points in time.

21. The device of claim 20 wherein the at least two points in time comprise two adjacent points in time.

22. A method for diagnosing operation of an industrial process or monitoring system, comprising:
    receiving an input in a field device related to a process signal;
    calculating with a microprocessor in the field device a first statistical parameter related to a statistical parameter of the process signal, wherein the statistical parameter is selected from the group of statistical parameters comprising of minimum, maximum, range, mean, root mean squared, standard deviation, $Q_{25}$, $Q_{50}$ and $Q_{75}$;
    implementing a plurality of filter algorithms and filtering the received process signal based upon at least one of the filter algorithms received to provide a filtered value of the process signal;
    calculating with the microprocessor a second statistical parameter based upon the received filtered value of the process signal wherein the statistical parameter is selected from the group of statistical parameters comprising of minimum, maximum, range, mean, root mean squared, standard deviation, $Q_{25}$, $Q_{50}$ and $Q_{75}$; and
    diagnosing operation of the industrial process with the microprocessor based upon the first statistical parameter and the second statistical parameter.

23. The method of claim 22 wherein the filter is configured to trim data from the input data.

24. The method of claim 23 wherein the filter is configured to remove outliers in the data.

25. The method of claim 23 wherein the filter is configured to remove data based upon a comparison of the data with a moving average.

26. The method of claim 23 wherein the filter is configured to remove data spikes in the data.

27. The method of claim 22 wherein the filter is selected from the group of filters consisting of low pass, high pass and band pass filter.

28. The method of claim 22 including selecting a filter function in a filter module which includes a plurality of filter functions.

29. The method of claim 22 wherein filtering comprises applying a difference filter.

30. The method of claim 29 wherein the filtering comprises providing a difference in the process signal between two points in time.

31. The method of claim 30 wherein the two points in time comprise adjacent points in time.

32. A field device for diagnosing operation of an industrial process control or monitoring system, comprising:
    an input coupled to the industrial process configured to receive a process signal;
    a microprocessor configured to implement:
        an enhanced statistical parameter module, comprising:
            a first statistical parameter module configured to calculate a plurality of statistical parameters and having a first statistical parameter output related to at least one statistical parameter of the received process signal based upon at least one of the plurality of statistical parameters;

a filter having a filter output related to a filtered value of the received process signal, the filtered value comprising a difference in the process signal between at least two points in time;

a second statistical parameter module configured to calculate a plurality of statistical parameters and having a second statistical parameter output related to at least one statistical parameter of the filter output based upon at least one of the plurality of statistical parameters; and a diagnostic module configured to diagnose operation of the industrial process based upon the first at least one statistical parameter and the second at least one statistical parameter;

an output configured to provide a diagnostic output from diagnostic module.

* * * * *